US008818993B2

(12) United States Patent
Boyd et al.

(10) Patent No.: US 8,818,993 B2
(45) Date of Patent: Aug. 26, 2014

(54) PROVIDING CONSOLIDATED PROJECT INFORMATION SERVICE

(75) Inventors: Christopher Boyd, Seattle, WA (US); Eric Zenz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 159 days.

(21) Appl. No.: 12/916,117

(22) Filed: Oct. 29, 2010

(65) Prior Publication Data
US 2012/0109938 A1 May 3, 2012

(51) Int. Cl.
*G06F 7/00* (2006.01)
*G06F 17/30* (2006.01)

(52) U.S. Cl.
USPC ........... 707/722; 707/780; 707/752; 705/7.12

(58) Field of Classification Search
None
See application file for complete search history.

(56) References Cited

U.S. PATENT DOCUMENTS

| | | | |
|---|---|---|---|
| 6,842,906 B1 * | 1/2005 | Bowman-Amuah | 719/330 |
| 2003/0212586 A1 | 11/2003 | Majd et al. | |
| 2004/0187140 A1 * | 9/2004 | Aigner et al. | 719/328 |
| 2006/0241997 A1 | 10/2006 | Bhatawdekar et al. | |
| 2006/0271563 A1 * | 11/2006 | Angelo et al. | 707/100 |
| 2007/0294617 A1 * | 12/2007 | Kroeger | 715/530 |
| 2008/0114724 A1 | 5/2008 | Indeck et al. | |
| 2009/0187581 A1 * | 7/2009 | Delisle et al. | 707/100 |
| 2009/0319295 A1 * | 12/2009 | Kass-Hout et al. | 705/2 |
| 2011/0066425 A1 * | 3/2011 | Hudgins et al. | 704/10 |
| 2011/0320494 A1 * | 12/2011 | Fisher et al. | 707/780 |

FOREIGN PATENT DOCUMENTS

WO 0116838 A2 8/2001

OTHER PUBLICATIONS

"Microsoft Project Server", Retrieved at << http://ax-global.com/microsoft-project-server.html >>, retrieved date: Jan. 9, 2010, pp. 2.
"A Single View: Integrating Structured and Unstructured Data/Information within the Enterprise", Retrieved at << http://Isdis.cs.uga.edu/GlobalInfoSys/Structured-and-Unstructured-for-EIPs.pdf >>, Jan. 2002, pp. 20.
"Project Management 2.1", Retrieved at << http://www.fileguru.com/Project-Management/info >>, retrieved date: Jan. 9, 2010, pp. 4.
"Enterprise Data Mashups: data integration without boundaries—combine structured, unstructured and web data", Retrieved at << http://www.usfst.com/article/Enterprise-Data-Mashups-data-integration-without-boundaries-combine-structured-unstructured-and-web-data/ >>, retrieved date: Jan. 9, 2010, pp. 4.

* cited by examiner

*Primary Examiner* — Dung K Chau
(74) *Attorney, Agent, or Firm* — David Andrews; Tom Wong; Micky Minhas

(57) ABSTRACT

Structured and unstructured project information is collected, analyzed, and consolidated by a project service. On-demand or periodically, the project service consolidates the unstructured project information and the structured project information to present to an end user as aggregate information. The aggregate information may be formatted based on user criteria.

19 Claims, 6 Drawing Sheets

PROVIDING CONSOLIDATED PROJECT INFORMATION SERVICE

BACKGROUND

Large organizations have requirements for well-defined and effective Information Technology (IT) governance. Frequently, IT executives are tasked with various responsibilities to improve the organization's productivity. Some of these organizational requirements are balancing demand from varying sets of business customers, maintaining alignment with overall business objectives, delivering global stability while providing localized value, and delivering value within financial and resource constraints. Many executives meet their organization requirements through established project management practices.

Traditional project management is a discipline that helps organizations to effectively realize business value by delivering projects and programs on time and within budget. A project is a temporary effort with a defined beginning and end (constrained by a variety of resources) undertaken to meet unique goals and objectives. A project's goal is to usually bring about beneficial change or added value to the organization. The temporary nature of the project stands in contrast with the repetitive and continued production-oriented nature of business. In practice, the management of these two systems is often found to be quite different. As a result, the management of a project requires the development of distinct technical skills and the adoption of separate management practices.

One way IT leaders meet project management goals is through the deployment and utilization of employee collaboration efforts across their organization. Modern employee collaboration efforts include multitude of resources, one of which is enhanced work participation through project applications. Project applications deliver powerful, visually enhanced ways to effectively manage a wide range of projects and programs. From meeting critical deadlines to selecting the right resources and empowering employees, project applications offer easier and more intuitive experiences to simplify production and to realize improved results.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a consolidated task and project information service. According to some embodiments, a project service system may consolidate task and project information from a number of unstructured and structured sources. Through the consolidation, aggregated task and project data may be presented employing structured, rolled-up, and/or editable surfaces such as various application user interfaces.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
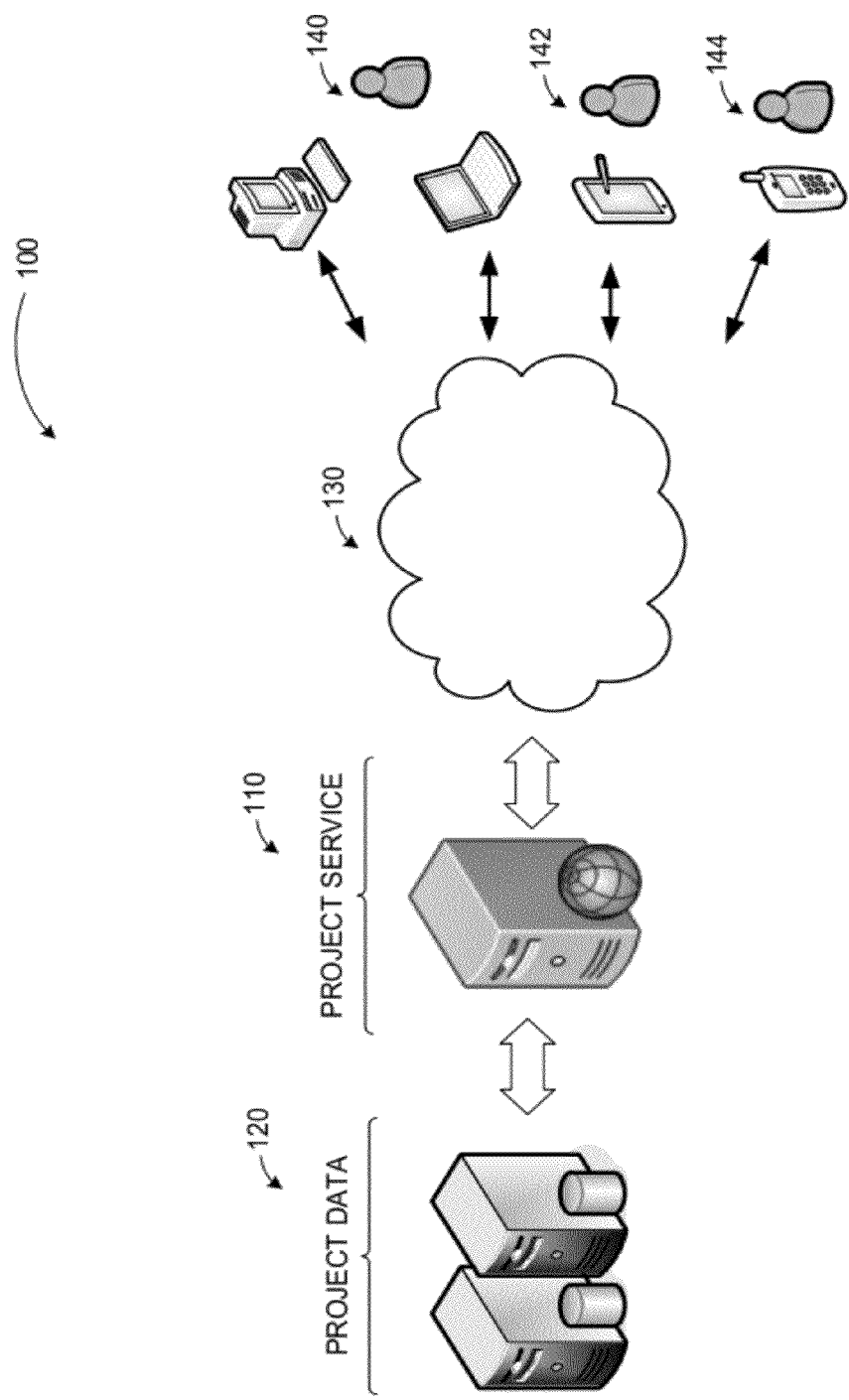
FIG. 1 is a diagram illustrating example components of a system providing project information consolidation service.

As briefly described above, consolidated project information may be provided by collecting and aggregating structured and unstructured project information from a variety of sources. Structured project information may be retrieved from a project server. Unstructured project information may be received from a collaboration server or other sources. Consolidated project information may be formatted and transmitted to a variety of client applications for presentation to a user. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for managing project services in a networked environment, where embodiments may be implemented. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram illustrating example components of a system providing project information consolidation service. In diagram 100, the server 110 may execute a project service application and transmit project information through network 130. The network 130 may be a local network or may be an external entity such as an Internet based infrastructure. Network 130 may provide wired or wireless connectivity. Network nodes may connect to each other through unsecured or secured connectivity. An example of a secured connectivity may be a Virtual Private Network (VPN) established among the network nodes with the use of encrypted communications.

The server 110 may be a project service provider communicating with its clients through a variety of protocols, an example of which may be the Hyper Text Transport Protocol (HTTP). The project service server may also provide services to accommodate organization specific end user applications to provide content to users. An example of such services may be providing task information grouped by project team members to a user. Additionally, project service provider may enable a user to access the service through multiple client devices (e.g. client 140) or multiple users to access the same service simultaneously (e.g. clients 142, 144).

In an embodiment, the server 120 may be a project data provider hosting project information. The project data provider may provide the project service provider with project information such as an available resource, resource utilization metric, progress information, and project tasks. In an example scenario, project data provider may host project management information. The project service provider may receive and retrieve project information from project data provider and consolidate structured and unstructured project information. The unstructured information may be an email, a task, a list, a shared document, and other data containing project information. The project service provider may aggregate the structured and unstructured information and format the aggregate information. The formatted aggregate information may be transmitted to the user(s).

Figure 2:
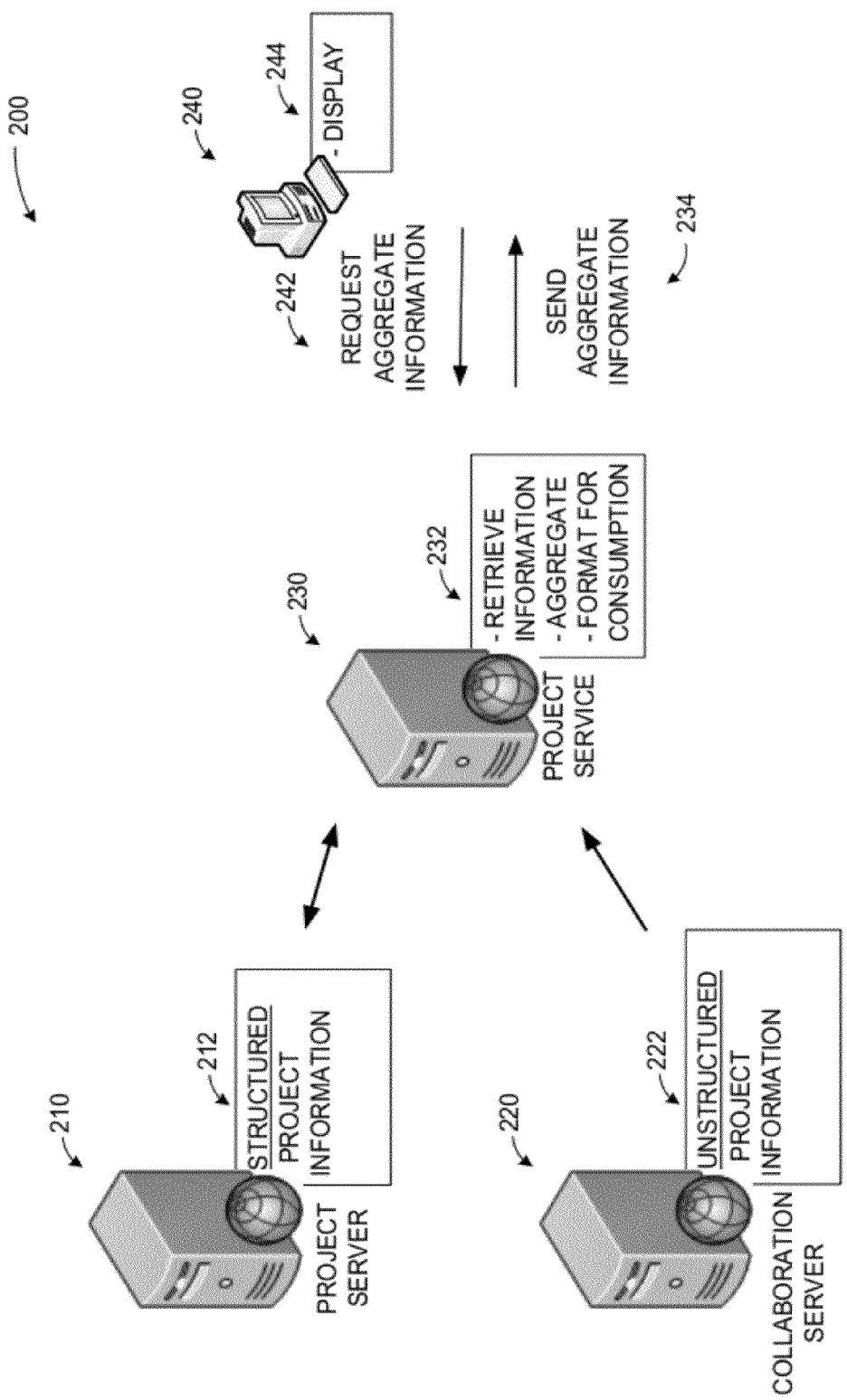
FIG. 2 illustrates example interactions in aggregating and formatting project information for presentation.

FIG. 2 illustrates example interactions in aggregating and formatting project information for presentation. A system according to embodiments may employ a project service 230 to aggregate unstructured and structured task and project information. Project service 230 may provide a client with consolidated task and project information as formatted aggregate information. According to some embodiments, the project service 230 may receive unstructured project information from user collaboration servers such as email servers, document sharing servers, and comparable ones. According to other embodiments, the project service 230 may retrieve structured project information from project servers such as task coordination systems and resource management servers, synchronize the received information to create formatted aggregate information for user consumption (232).

Diagram 200 illustrates project server 210, which may host a service that manages and stored structured project information 212. The project server 210 may be a standalone system to manage and monitor project parts such as resource utilization, progress tracking, and milestone monitoring. The capabilities of the project server may also be provided by an application program executed in an integrated system such as a computing cluster of a business organization.

Structured project information 212 may contain attributes defined by the project requirements. Such attributes may meet standards for data integration across multiple platforms. For example, structured project information may be contained in Extensible Markup Language (XML) documents. The information may be stored in a project database or other forms of storage schemes.

The project server 210 may make the structured project information 212 available through a variety of accessibility schemes. It may provide access to the information through standardized communication pathways such as web services. Additionally, the project server may employ authentication and encryption methods to grant selective access to hosted information. It may provide information on request. Alternatively, it may provide information by a subscription method in which the project server 210 may push out information updates to its subscribers on a predetermined schedule.

Collaboration server 220 may host a collaboration service that processes and stores unstructured project information 222. The collaboration server may be a standalone system enabling users to exchange emails, other forms of messages, documents, maintain lists, tasks, and similar services. The capabilities of the server may also be provided by a program application executing in an integrated system such as a computing cluster of an organization.

Unstructured project information 222 may be generated/processed/stored in a variety of forms by a collaboration server. For example, an email message may contain unstructured project information such as project title in an email header and other information such as project resources and resource allocation decisions in the email body. Alternatively, a document hosted in a document sharing system may contain lists of project resources such as available team members and their schedules throughout the duration of the project. As a result, the unstructured project information 222 may be stored in a variety of data stores such as in a file, a database, in memory, and other form factors. Storage containers may meet standards to enable cross platform distribution and utilization.

The collaboration server 220 may make unstructured project information 222 available through a variety of accessibility schemes. It may provide proprietary pathways to stored information. It may provide access to information through standardized pathways such as web services. Additionally, the collaboration server 220 may provide authentication and encryption methods to grant selective access to unstructured information. It may provide information based on subscription schemes and push information updates to clients an example of which may be an email server sending email messages to client email application. Alternatively, the collaboration server may provide information to clients on an on-demand basis.

As discussed above, project service 230 may retrieve project information, aggregate the information, and format the information for consumption (232). Project service 230 may be executed on a standalone server or alternatively, it may be an application program executed in a computing environment such as an organization's computing cluster. It may connect project server and collaboration server through automatic and manual schemes. Automatic connection may involve information provider recognition based authentication in a network environment. Manual connection may require user configuration. An example may be subscribing to project server's information pathways. Another example may be setting up an email account with an email server to receive emails with project information content in the project service provider.

According to some embodiments, project service 230 may store received unstructured project information in local cache. However, structured project information may be retrieved by default on-demand from project server 210. On-demand information retrieval from project information provider may result in retrieval of newest project information. Storing structured project information for later retrieval in the project service provider local cache may also be an option.

According to some example implementations, the project service may consolidate the unstructured information with the structured information by searching and retrieving attribute types of the unstructured information that match the attribute types of the structured project information. An example may be a task list. A project server may store a task list with attributes including a name, duration, and/or a start date. The project service may retrieve an email from an email server that may have a heading indicating a new task for the project with email body stating duration of the new task and a start date. The project service may store those attributes of the task from the email in local cache.

Additionally, the project service may synchronize unstructured and structured information by replacing attributes of the structured information with that of the unstructured information if the unstructured attributes contain newer values. It may perform reverse synchronization if the structured attribute values contain newer values.

According to an example scenario, the project service may retrieve a task list from the project server upon a user's (240) request to display (244) latest the task list, add the task attributes stored in local cache from the email to the task list, format the task list based on user viewing requirements (formatting), and transmit the task list to the user. Additionally, local cache stored project information may be made available to the project server to update its structured information with the project information received from collaboration server such as the email example above.

The user may request the aggregate information 242 with certain viewing requirements. The project service may send aggregate information 234 meeting the viewing requirements. To provide the user with the requested view, the project service may format the aggregate information. Formatting may take the form of grouping information based on an aggregate information attribute. An example may be sending a task list grouped by project participants. Alternatively, aggregate information may be sent based on search parameters acting to limit the returned project information. An example may be a range request, which may seek project information meeting specific conditions of the range. Another example may be sending a task list ending on a user provided date range. Additionally, the user may interact with the project service with an end user application executed on a device capable of displaying the project aggregate data such as a desktop computer, a laptop computer, a personal digital assistant (PDA) device, a tablet, and a smartphone.

Figure 3:
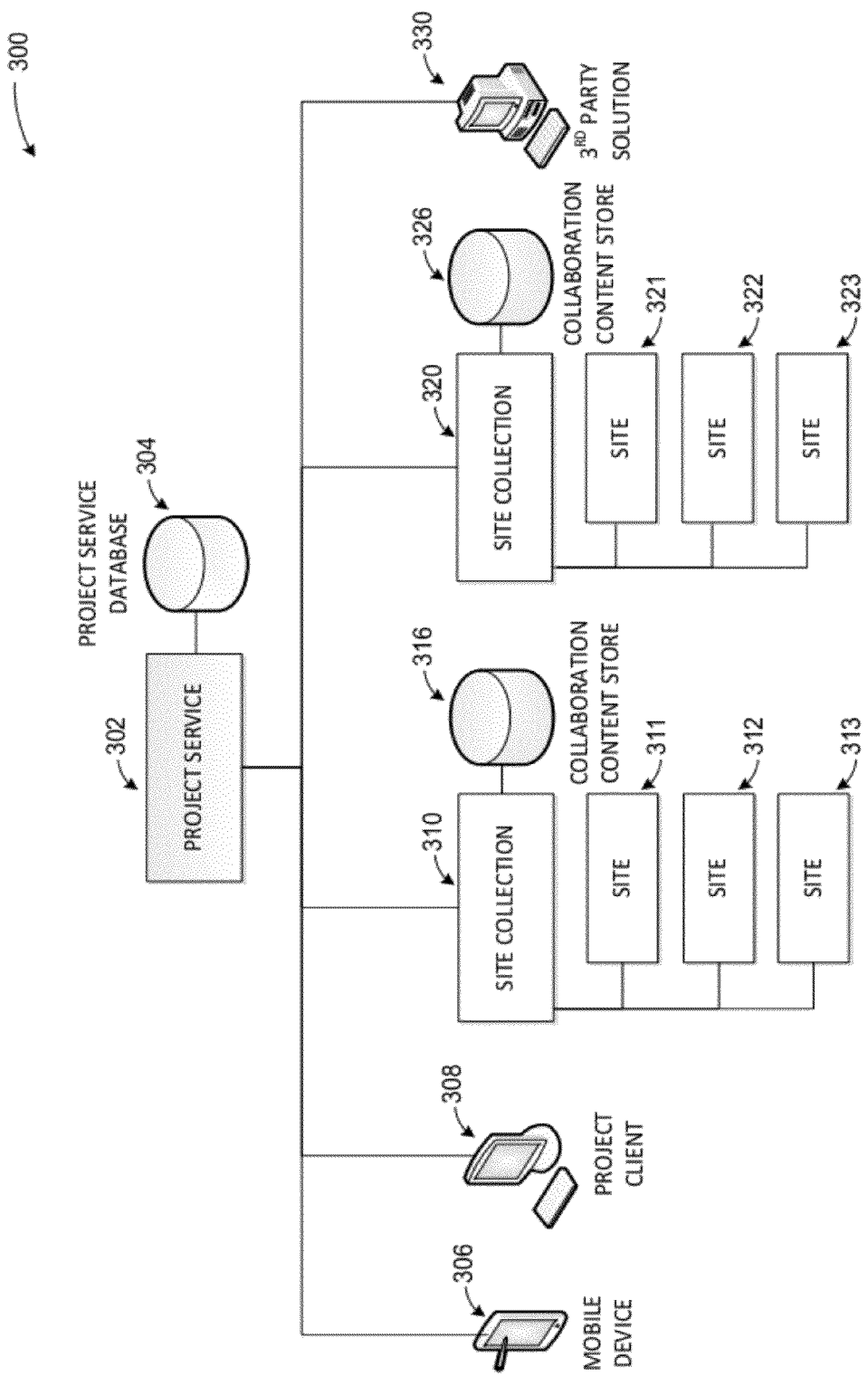
FIG. 3 illustrates an example system providing project information consolidation service.

FIG. 3 illustrates an example system providing project information consolidation service. According to some embodiments, task and project data from a number of unstructured and structured sources may be aggregated by project service 302 and stored at project service database 304. The data may come from lists or other data managed by collaboration services 310 and 320. Each collaboration service may include its respective sites (311-313 and 321-323) and content stores 316 and 326. The data may also come from third party solutions 330 (providers of structured or unstructured data) using an Application Programming Interface (API) for project service 302.

Project service 302 may provide a synchronization mechanism to maintain data in synchronization with unstructured data sources such as collaboration lists. Project service 302 may be aware of the unstructured list data either through the use of the task list in a formal project template or the end user enrolling their list with the project service 302. When information in the collaboration list changes, the project service may recognize the changes and synchronize the data to the project service database 304.

Organizations that employ a formal project management process may use project management functionality associated with a dedicated project server and a project client 308, which may enable them to standardize their project data in a structured format for reporting and consistency. Project service 302 may also handle the structured project data through a project client active cache and/or through a project server interface. This data may be combined with the unstructured data in the project service database 304, thereby providing a single data store for all the unstructured and structured, task and project data for an organization. Project service 302 may also provide the ability to show aggregated views of the organization's task and project data, structured and unstructured, in various dashboards and interactive surfaces such as web parts and collaborative lists. This allows for the editing and analysis of the unstructured and structured data together.

The systems and implementations of project information consolidation service discussed above are for illustration purposes and do not constitute a limitation on embodiments. Structured and unstructured project information may be aggregated employing other modules, processes, and configurations using the principles discussed herein.

Figure 4:
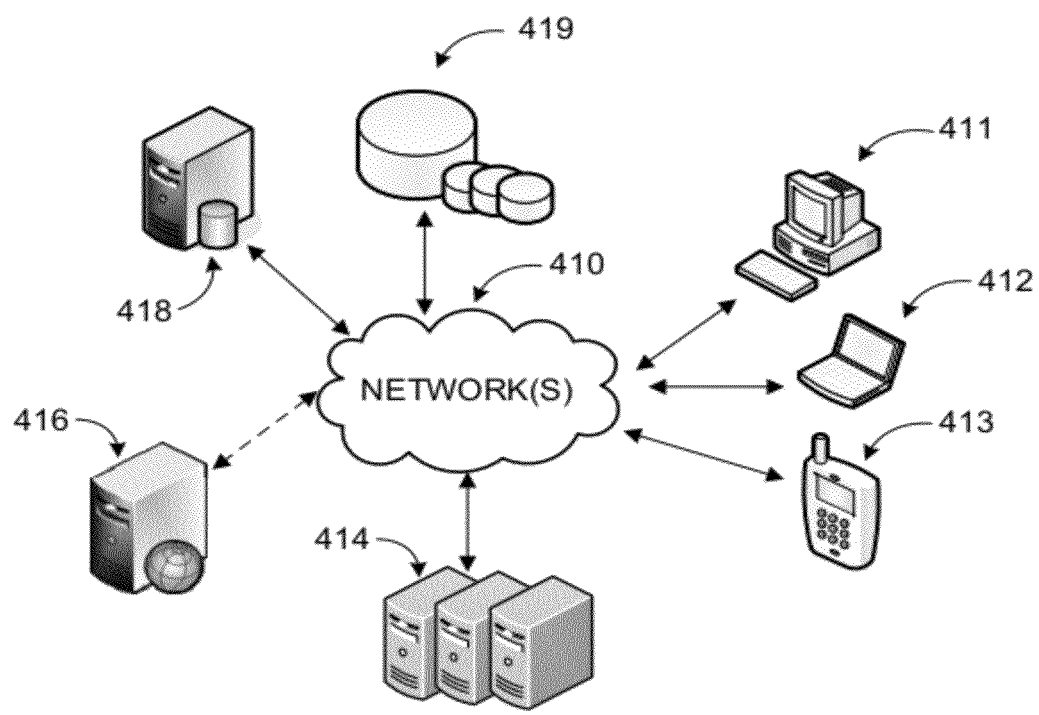
FIG. 4 is a networked environment, where a system according to embodiments may be implemented.

FIG. 4 is an example networked environment, where embodiments may be implemented. A project information consolidation algorithm may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410.

As discussed above, a project service server may execute the algorithm to aggregate unstructured information from a collaboration server or comparable sources. If the collaboration server transmits unstructured information, the project service may aggregate the unstructured information with structured information from the project server. The project service may transmit the aggregated information to the client devices 411-413 periodically or upon request.

Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to aggregate structured and unstructured project information. Furthermore, the networked environments discussed in FIG. 4 are for illustration purposes only. Embodiments are not limited to the example applications, modules, or processes.

Figure 5:
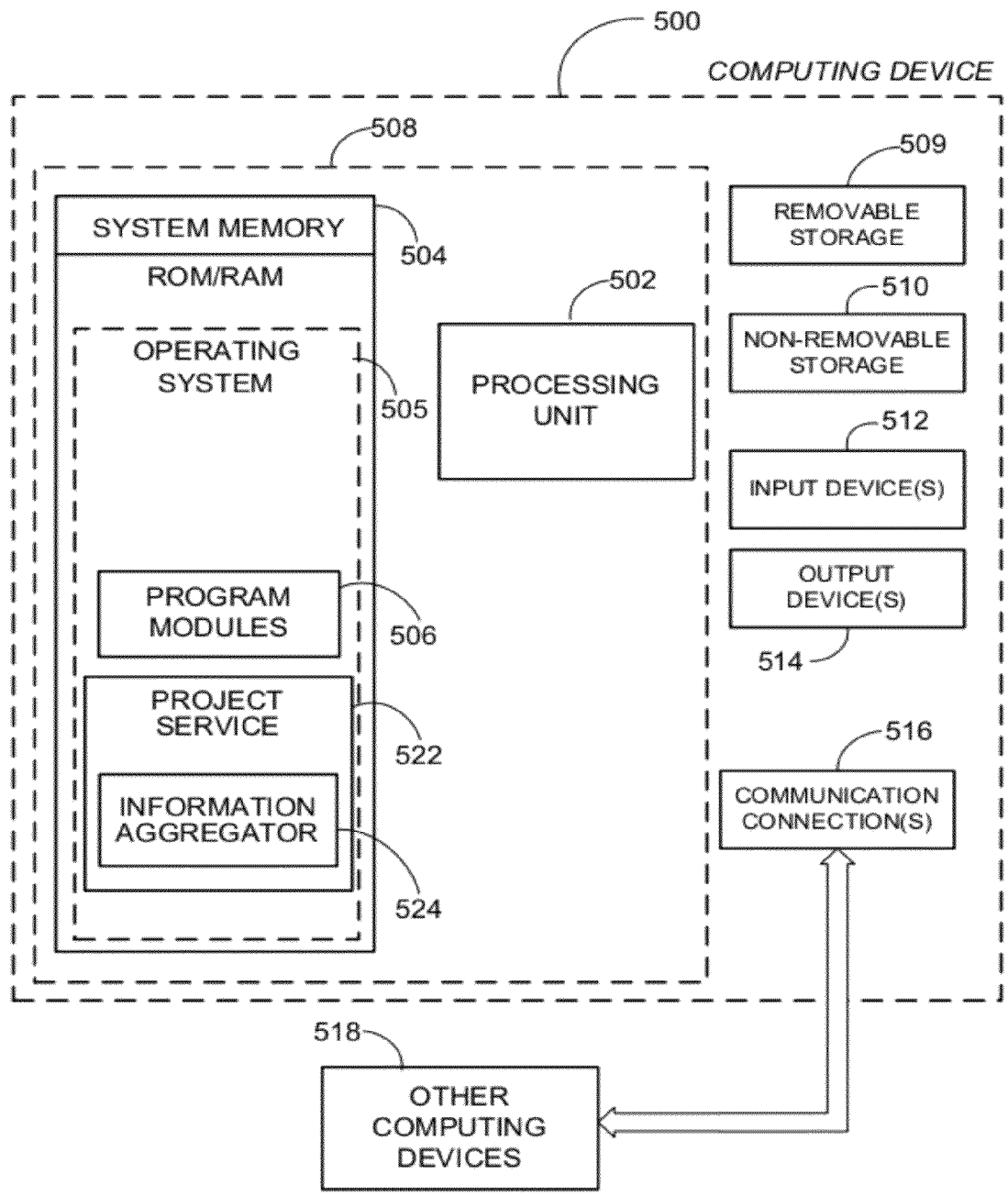
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server that aggregates structured and unstructured project information from a variety of sources to transmit to requesting user and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, project service 522, and information aggregator 524.

Project service 522 may be part of a service that aggregates project information from a variety of sources and transmits to requesting user. Information aggregator module 524 may search and retrieve attributes matching structured information attributes from unstructured information. Locally stored unstructured information attributes may be aggregated with structured information attributes, formatted, and transmitted to user on-demand This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, and includes any information delivery media. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
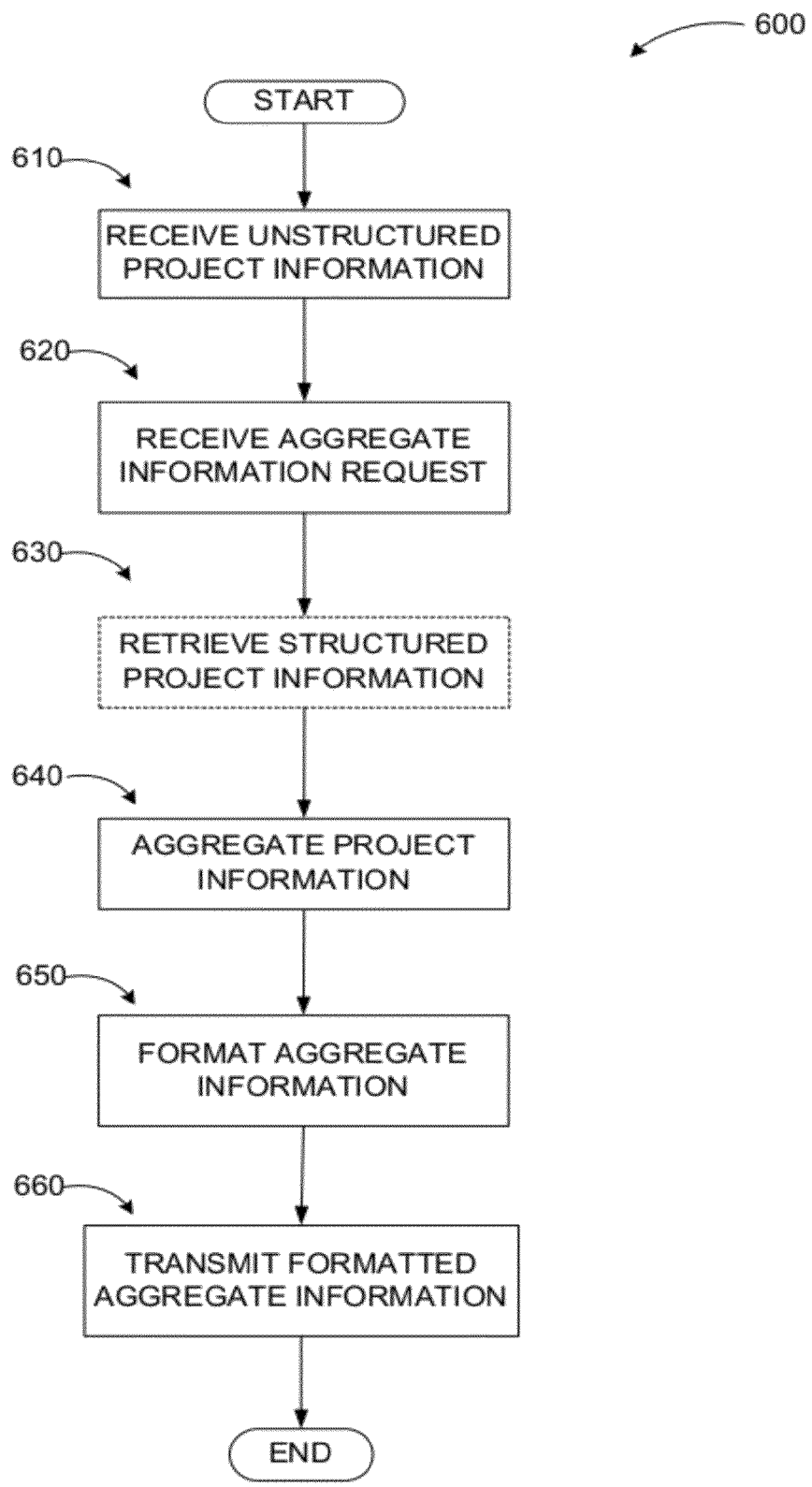
FIG. 6 illustrates a logic flow diagram for a process of to providing consolidated project information service according to embodiments.

FIG. 6 illustrates a logic flow diagram for process 600 of providing consolidated project information service according to embodiments. Process 600 may be implemented by a server in a project management environment providing services to clients.

Process 600 begins with operation 610, where the project service may receive unstructured project information. An unstructured project information source may be a collaboration server providing collaborative authoring, task sharing, and similar services, or an email server transmitting emails containing project information such as an email about a new task. The project service may search and retrieve attributes of the unstructured information based on attributes of structured information available from project server. And, the project service may store the attributes in local cache.

At operation 620, the project service may receive an aggregate information request from a user. The aggregate information request may contain formatting instructions. Upon receiving the request, the project service may optionally retrieve structured project information 630 from a project server if such information exists. Then, the project service may aggregate the structured information with the stored attributes of the unstructured information at operation 640 to generate the aggregate information.

At operation 650 the project service may format the aggregate information based on the formatting instructions transmitted by the user. An example may be the grouping of the aggregate information such as a task list based on project participants. And, at operation 660, the project service may transmit the formatted aggregate information to the user.

The operations included in process 600 are for illustration purposes. Consolidating project information according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for consolidating project information, the method comprising:

receiving a request for aggregated information;

searching a project server for structured project information and a collaboration server for unstructured project information, wherein the structured project information includes attributes defined by project requirements to meet standards for at least one from a set of: data integration, reporting, and consistency and is stored in a project database in Extensible Markup Language (XML) documents, and wherein the collaboration server hosts a collaboration service enabling users to exchange emails, messages, documents, and maintain lists and tasks and stores the unstructured project information in a data store including a file, a memory, and a database;

processing one of the documents hosted by the collaboration server to determine the unstructured project information including at least one from a set of: at least one available team member and at least one schedule associated with the at least one available team member throughout a project duration;

determining related structured and unstructured project information from the collaboration server based on matching one or more attribute types of the unstructured project information to one or more attribute types of the structured project information at an information aggregator module, wherein the structured project information includes a task list with attributes including a name, a duration and a start date for each task, and the unstructured project information includes an email indicating in one of a heading and body a name, a duration, and a start date of a new task;

retrieving the structured and unstructured project information from the collaboration server and the project server employing authentication and encryption methods utilized by the project server and the collaboration server for granting selective access to the structured and unstructured project information;

aggregating the structured and unstructured project information at an information aggregator module by adding the name, the duration, and the start date of the new task from one of the heading and the body of the email to the task list;

formatting the aggregated information in accordance with one or more formatting instructions associated with a user's viewing preferences by grouping the task list based on project participants and limiting based on a date range defined by the request, wherein the formatting instructions are included in the request; and transmitting the formatted aggregate information.

2. The method of claim 1, further comprising:

storing the one or more attributes of the unstructured project information in a local cache.

3. The method of claim 1, wherein the unstructured project information comprises at least one from a set of: a collection of emails, a collection of tasks, a library of documents, and an arbitrary list.

4. The method of claim 1, wherein the structured project information comprises one from a set of: an available resource, a resource utilization metric, a progress information, and a task.

5. The method of claim 1, further comprising:

synchronizing the structured project information with the unstructured project information.

6. The method of claim 5, wherein the synchronizing the structured project information with the unstructured project information comprises replacing one or more attribute values of the structured project information with one or more attribute values of the unstructured project information if the one or more attribute values of the unstructured project information are newer than the one or more attribute values of the structured project information.

7. The method of claim 5, wherein the synchronizing the structured project information with the unstructured project information comprises replacing one or more attribute values of the unstructured project information with one or more attribute values of the structured project information if the one or more attribute values of the structured project information are newer than the one or more attribute values of the unstructured project information.

8. The method of claim 1, wherein the retrieving the unstructured project information further comprises receiving the unstructured project information by one of a subscription scheme with a provider and a push scheme from the provider.

9. The method of claim 1, wherein the structured project information is retrieved through one of an on-demand based selective access scheme and a scheduled push scheme.

10. The method of claim 1, wherein the aggregated information request includes one or more formatting instructions associated with a user's viewing preferences.

11. A server providing a project service for consolidating project information, the server comprising:

a memory;

a processor coupled to the memory, the processor executing at least one application associated with the project service in conjunction with instructions stored in the memory, wherein the project service is configured to:

monitor parts of a project including one or more of: resource utilization, progress tracking, and milestones;

receive a request for aggregated information;

enable an information aggregator module to search structured and unstructured project information for one or more attribute types of the structured and the unstructured project information on the project service and a collaboration service, the structured project information including a task list with attributes including a name, a duration and a start date for each task, wherein the attributes are defined by project requirements to meet standards for at least one from a set of: data integration, reporting, and consistency, the unstructured project information including an email indicating in one of a heading and body a name, a duration, and a start date of a new task, and wherein the collaboration service enables users to exchange emails, messages, documents, and maintain lists and tasks and stores the unstructured project information in a data store including a file, a memory, and a database;

process one of the documents hosted by the collaboration service to determine the unstructured project information including at least one from a set of: at least one available team member and at least one schedule associated with the at least one available team member throughout a project duration;

determine related structured and unstructured project information based on matching one or more attribute types of the unstructured project information to one or more attribute types of the structured project information, the attribute types comprising names, durations, and start dates;

retrieve the structured and unstructured project information at the information aggregator module employing authentication and encryption methods utilized by the project service and the collaboration service for granting selective access to the structured and unstructured project information;

aggregate the structured and unstructured project information at the information aggregator module by adding the name, the duration, and the start date of the new task from one of the heading and the body of the email to the task list;

format the aggregated information in accordance with one or more formatting instructions associated with a user's viewing preferences, wherein the formatting instructions are included in the request; and transmit the formatted aggregate information.

12. The server of claim 11, wherein the formatting instructions include at least one of a grouping instruction for the aggregate information based on an attribute of the aggregate information and a range request to transmit a portion of the aggregate information that meets the range.

13. The server of claim 11, wherein the structured project information is provided by a project server and the unstructured project information is provided by a collaboration server.

14. The server of claim 13, wherein the collaboration server includes at least one of an email server and a document sharing server.

15. The server of claim 13, wherein the project service is further configured to connect to the project server and the collaboration server through one of a subscription based automatic scheme and a manual scheme.

16. The server of claim 13, wherein the project service is further configured to provide a single data resource for the structured and unstructured project information.

17. A computer-readable memory device with instructions stored thereon for consolidating project information, the instructions comprising:

receiving a request for aggregated information at a project service;

enabling an information aggregator module to search a project server for structured project information and a collaboration server for unstructured project information, wherein the structured project information includes attributes defined by project requirements to meet standards for at least one from a set of: data integration, reporting, and consistency and is stored in a project database in Extensible Markup Language (XML) documents, and wherein the collaboration server hosts a collaboration service enabling users to exchange emails, messages, documents, and maintain lists and tasks and stores the unstructured project information in a data store including a file, a memory, and a database;

processing one of the documents hosted by the collaboration server to determine the unstructured project information including at least one from a set of: at least one available team member and at least one schedule associated with the at least one available team member throughout a project duration;

determining related structured project information from the project server and unstructured project information from the collaboration server based on matching one or more attribute types of the unstructured project information to one or more attribute types of the structured project information at the information aggregator module, the structured project information including a task list with attributes including a name, a duration and a start date for each task, and the unstructured project information including an email indicating in one of a heading and body a name, a duration, and a start date of a new task;

retrieving the structured and unstructured project information employing authentication and encryption methods utilized by the project server and the collaboration server for granting selective access to the structured and unstructured project information;

aggregating the structured and unstructured project information at the information aggregator module by adding the name, the duration, and the start date of the new task from one of the heading and the body of the email to the task list;

formatting the aggregated information in accordance with one or more formatting instructions associated with a user's viewing preferences by grouping the task list based on project participants and limiting based on a date range defined by the request, wherein the formatting instructions are included in the request; and transmitting the formatted aggregate information to the user.

18. The computer-readable memory device of claim 17, wherein the instructions further comprise:

synchronizing the structured project information with the unstructured project information by:

replacing one or more attribute values of the structured information with one or more attribute values of the unstructured information if the one or more attribute values of the unstructured information are newer than the one or more attribute values of the structured information; and replacing one or more attribute values of the unstructured information with one or more attribute values of the structured information if the one or more attribute values of the structured information are newer than the one or more attribute values of the unstructured information.

19. The computer-readable memory device of claim 18, wherein the project service is aware of the unstructured information through one of: use of a task list in a formal project template managed by the project server and a user enrolling their list with the project service.

* * * * *